(12) United States Patent
Thongrattana et al.

(10) Patent No.: US 9,236,071 B1
(45) Date of Patent: Jan. 12, 2016

(54) ETCHING CONTINUOUS PERIODIC PATTERN ON A SUSPENSION TO ADJUST PITCH AND ROLL STATIC ATTITUDE

(71) Applicant: Western Digital Technologies, Inc., Irvine, CA (US)

(72) Inventors: Chaiya Thongrattana, Bangkok (TH); Wirat Khamon, Lopburi (TH); Ruksakul Boonpuang, Ayutthaya (TH)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/578,454

(22) Filed: Dec. 21, 2014

(51) Int. Cl.
*G11B 5/48* (2006.01)

(52) U.S. Cl.
CPC .............. *G11B 5/4833* (2013.01); *G11B 5/48* (2013.01)

(58) Field of Classification Search
CPC .................................. G11B 5/48; G11B 21/16
USPC ............ 360/245.6, 245, 245.2, 245.3, 245.8, 360/245.9, 234.6, 234.7
See application file for complete search history.

(56) References Cited

U.S. PATENT DOCUMENTS

| | | | |
|---|---|---|---|
| 5,832,764 A | 11/1998 | Girard | |
| 6,011,239 A | 1/2000 | Singh et al. | |
| 6,049,973 A | 4/2000 | Frank, Jr. et al. | |
| 6,467,153 B2 | 10/2002 | Butts et al. | |
| 6,515,832 B1 * | 2/2003 | Girard | 360/245.3 |
| 6,651,192 B1 | 11/2003 | Viglione et al. | |
| 6,657,801 B1 | 12/2003 | Chue et al. | |
| 6,687,093 B1 | 2/2004 | Butler et al. | |
| 6,751,041 B1 | 6/2004 | Codilian et al. | |
| 6,788,480 B1 | 9/2004 | Codilian et al. | |
| 6,791,782 B1 | 9/2004 | Codilian et al. | |
| 6,792,669 B2 | 9/2004 | Codilian | |
| 6,798,592 B1 | 9/2004 | Codilian et al. | |
| 6,837,092 B1 * | 1/2005 | Ubl et al. | 72/342.1 |
| 6,894,861 B1 | 5/2005 | Codilian et al. | |
| 6,897,393 B1 | 5/2005 | Codilian et al. | |
| 6,898,044 B1 | 5/2005 | Chheda | |
| 6,943,972 B1 | 9/2005 | Chue et al. | |
| 6,952,329 B2 | 10/2005 | Childers et al. | |
| 7,003,626 B1 | 2/2006 | Chheda et al. | |
| 7,027,242 B1 | 4/2006 | Terrill et al. | |
| 7,046,467 B1 | 5/2006 | Chheda | |
| 7,058,759 B1 | 6/2006 | Reiser et al. | |
| 7,069,156 B2 | 6/2006 | Zeng | |
| 7,072,129 B1 | 7/2006 | Cullen et al. | |
| 7,076,391 B1 | 7/2006 | Pakzad et al. | |
| 7,076,603 B1 | 7/2006 | Chheda | |
| 7,136,242 B1 | 11/2006 | Chue et al. | |
| 7,139,145 B1 | 11/2006 | Archibald et al. | |
| 7,145,744 B1 | 12/2006 | Clawson et al. | |
| 7,152,303 B2 | 12/2006 | Childers et al. | |
| 7,160,403 B2 | 1/2007 | Yao | |
| 7,178,432 B1 | 2/2007 | Han et al. | |
| 7,199,959 B1 | 4/2007 | Bryant | |
| 7,203,020 B1 | 4/2007 | Viglione et al. | |
| 7,209,310 B1 | 4/2007 | Tsai et al. | |
| 7,213,433 B2 | 5/2007 | Ubl et al. | |
| 7,222,410 B1 | 5/2007 | Klassen et al. | |

(Continued)

*Primary Examiner* — Allen T Cao

(57) ABSTRACT

A method of manufacturing a suspension for a head of a data storage device is disclosed, the method comprising etching at least one continuous cycle of a periodic pattern on the suspension, wherein a first part of the continuous cycle adjusts a pitch static attitude (PSA) of the suspension and a second part of the continuous cycle adjusts a roll static attitude (RSA) of the suspension.

20 Claims, 4 Drawing Sheets

(56) References Cited

U.S. PATENT DOCUMENTS

| | | |
|---|---|---|
| 7,236,911 B1 | 6/2007 | Gough et al. |
| 7,269,525 B1 | 9/2007 | Gough et al. |
| 7,458,282 B1 | 12/2008 | Wuester, Sr. et al. |
| 7,490,398 B1 | 2/2009 | Klassen et al. |
| 7,506,553 B1 | 3/2009 | Panyavoravaj |
| 7,532,438 B1 * | 5/2009 | Mei et al. .................. 360/245.8 |
| 7,549,204 B1 | 6/2009 | Vangal-Ramamurthy et al. |
| 7,552,526 B1 | 6/2009 | Klassen et al. |
| 7,559,590 B1 | 7/2009 | Jones |
| 7,561,416 B1 | 7/2009 | Sarraf |
| 7,596,722 B1 | 9/2009 | Pakzad et al. |
| 7,634,375 B1 | 12/2009 | Pakzad et al. |
| 7,653,983 B1 | 2/2010 | Klassen |
| 7,661,189 B2 | 2/2010 | Shindo et al. |
| 7,669,711 B1 | 3/2010 | Westwood |
| 7,671,599 B1 | 3/2010 | Tan et al. |
| 7,673,638 B1 | 3/2010 | Boynton et al. |
| 7,690,705 B1 | 4/2010 | Roberts et al. |
| 7,743,486 B1 | 6/2010 | Klassen et al. |
| 7,863,889 B1 | 1/2011 | Bamrungtham |
| 7,869,182 B1 | 1/2011 | Tan et al. |
| 7,869,183 B1 | 1/2011 | Tan et al. |
| 7,874,424 B1 | 1/2011 | Westwood |
| 7,896,218 B2 | 3/2011 | Rakpongsiri et al. |
| 7,900,272 B1 | 3/2011 | Tan et al. |
| 7,912,666 B1 | 3/2011 | Pakzad et al. |
| 7,916,599 B1 | 3/2011 | Panyavoravaj et al. |
| 7,921,543 B2 | 4/2011 | Trongjitwikrai et al. |
| 7,940,487 B1 | 5/2011 | Krishnan et al. |
| 7,974,038 B2 | 7/2011 | Krishnan et al. |
| 7,980,159 B1 | 7/2011 | Han |
| 7,987,585 B1 | 8/2011 | Klassen et al. |
| 8,066,171 B1 | 11/2011 | Rakpongsiri et al. |
| 8,078,421 B1 | 12/2011 | Shastry et al. |
| 8,085,506 B1 * | 12/2011 | Ee et al. ..................... 360/245.8 |
| 8,092,610 B1 | 1/2012 | Tarrant |
| 8,094,414 B1 | 1/2012 | Cheng et al. |
| 8,098,460 B1 | 1/2012 | Jen et al. |
| 8,127,643 B1 | 3/2012 | Tan |
| 8,135,208 B1 | 3/2012 | Vangal-Ramamurthy |
| 8,162,366 B1 | 4/2012 | Tan et al. |
| 8,168,033 B1 | 5/2012 | Mohamad Nor |
| 8,180,487 B1 | 5/2012 | Vangal-Ramamurthy et al. |
| 8,199,425 B1 | 6/2012 | Gustafson et al. |
| 8,218,256 B1 | 7/2012 | Lin et al. |
| 8,223,448 B1 | 7/2012 | Haw et al. |
| 8,230,570 B1 | 7/2012 | Choong |
| 8,245,601 B1 | 8/2012 | Hastama et al. |
| 8,267,831 B1 | 9/2012 | Olsen et al. |
| 8,270,118 B1 | 9/2012 | Cheng et al. |
| 8,300,338 B1 | 10/2012 | McFadyen |
| 8,307,537 B1 | 11/2012 | Klassen et al. |
| 8,312,585 B1 | 11/2012 | Tarrant |
| 8,322,235 B1 | 12/2012 | Keopuang et al. |
| 8,327,529 B1 | 12/2012 | Tan et al. |
| 8,335,049 B1 | 12/2012 | Liu et al. |
| 8,338,742 B2 | 12/2012 | Flechsig et al. |
| 8,345,367 B1 | 1/2013 | Tharumalingam |
| 8,356,384 B1 | 1/2013 | Ferre et al. |
| 8,369,073 B2 | 2/2013 | Trinh et al. |
| 8,379,363 B1 | 2/2013 | Kolunthavelu et al. |
| 8,387,631 B1 | 3/2013 | Thonghara et al. |
| 8,424,418 B1 | 4/2013 | Wuester, Sr. et al. |
| 8,424,824 B1 | 4/2013 | Tan et al. |
| 8,432,630 B1 | 4/2013 | Lin et al. |
| 8,432,631 B1 | 4/2013 | Lin et al. |
| 8,441,761 B1 | 5/2013 | Hahn et al. |
| 8,447,430 B1 | 5/2013 | Tan et al. |
| 8,447,551 B1 | 5/2013 | Ong et al. |
| 8,451,578 B1 | 5/2013 | Tan et al. |
| 8,453,841 B1 | 6/2013 | James et al. |
| 8,454,755 B1 | 6/2013 | Tan et al. |
| 8,485,772 B1 | 7/2013 | Ismail et al. |
| 8,493,681 B1 | 7/2013 | Selvaraj |
| 8,537,480 B1 | 9/2013 | Haw |
| 8,544,164 B1 | 10/2013 | Cheng et al. |
| 8,547,657 B1 | 10/2013 | Liu et al. |
| 8,553,968 B1 | 10/2013 | Lee et al. |
| 8,561,285 B1 | 10/2013 | Vangal-Ramamurthy et al. |
| 8,565,511 B1 | 10/2013 | Sungkhaphong et al. |
| 8,582,229 B1 | 11/2013 | Krishnan |
| 8,596,107 B1 | 12/2013 | Wongdao et al. |
| 8,605,383 B1 | 12/2013 | Wang et al. |
| 8,640,328 B1 | 2/2014 | Yow et al. |
| 8,650,716 B1 | 2/2014 | Methe et al. |
| 8,653,824 B1 | 2/2014 | Liu et al. |
| 8,662,554 B1 | 3/2014 | Srisupun et al. |
| 8,683,676 B1 | 4/2014 | Wuester, Sr. et al. |
| 8,689,433 B1 | 4/2014 | Choong |
| 8,707,531 B1 | 4/2014 | Sungkhaphong et al. |
| 8,713,333 B1 | 4/2014 | Selvaraj |
| 8,763,790 B1 | 7/2014 | Neamsuwan et al. |
| 8,789,446 B1 | 7/2014 | Sungkhaphong et al. |
| 8,811,135 B1 | 8/2014 | Kasino et al. |
| 2002/0101686 A1 * | 8/2002 | Bement et al. ............. 360/245.3 |
| 2003/0154005 A1 | 8/2003 | Wong et al. |
| 2007/0297094 A1 * | 12/2007 | Sassine ....................... 360/245.9 |
| 2008/0084630 A1 | 4/2008 | Trongjitwikrai et al. |
| 2008/0123221 A1 * | 5/2008 | Zeng et al. ................. 360/245.3 |
| 2009/0157848 A1 | 6/2009 | Khoo |
| 2010/0108256 A1 | 5/2010 | Roajanasiri et al. |
| 2013/0057986 A1 | 3/2013 | Vangal-Ramamurthy et al. |
| 2013/0248545 A1 | 9/2013 | Thongjitti et al. |

\* cited by examiner

ETCHING CONTINUOUS PERIODIC PATTERN ON A SUSPENSION TO ADJUST PITCH AND ROLL STATIC ATTITUDE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

The components of the head (e.g., read element, write element, fly height actuator, etc.) are typically fabricated on a substrate of a wafer which is then sliced into individual sliders. A slider is coupled to a distal end of a suspension that biases the slider toward the disk surface. The slider comprises an air-bearing surface (ABS) wherein as the disk rotates, an air-bearing is formed between the slider and the disk that counteracts the bias force of the suspension. Accordingly, the head essentially flies just above the disk surface during write/read operations. The suspension is coupled to the actuator arm so that as the actuator arm rotates about the pivot, the slider is actuated radially over the disk surface. The initial geometry of the suspension may cause and undesirable pitch static attitude (PSA) and/or roll static attitude (RSA) at the slider air-bearing surface. Prior art techniques have attempted to adjust the PSA and RSA of the suspension by laser etching sets of parallel lines (horizontal and vertical relative to the length of the suspension). However, further improvement in PSA and RSA adjustment is desirable.

DETAILED DESCRIPTION

Figure 1A:
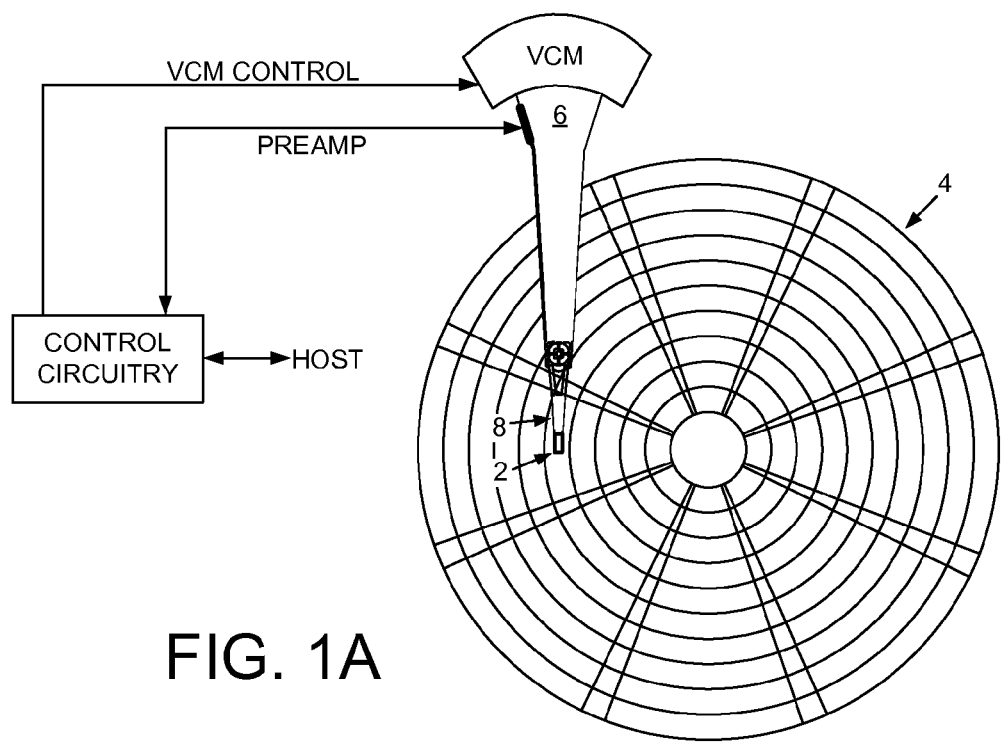
FIG. 1A shows a data storage device in the form of a disk drive according to an embodiment comprising a head actuated over a disk, wherein the head is coupled to an actuator arm through a suspension.
Figure 1B:
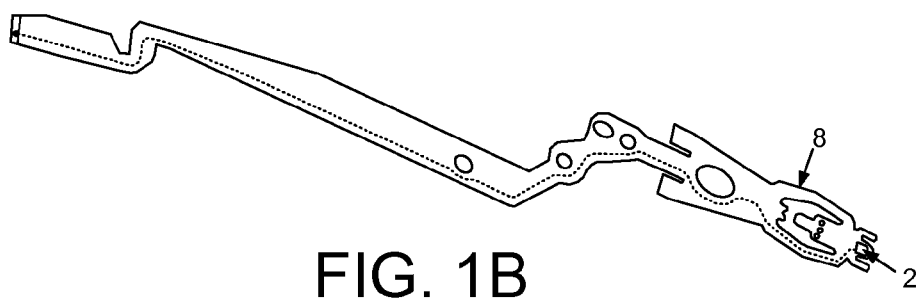
FIG. 1B shows a head coupled to a suspension according to an embodiment.

FIG. 1 shows a data storage device in the form of a disk drive according to an embodiment comprising a head 2 actuated over a disk 4, wherein the head 2 is coupled to an actuator arm 6 through a suspension 8. The suspension 8 comprises at least one continuous cycle of a periodic pattern etched on the suspension 8, wherein a first part of the continuous cycle adjusts a pitch static attitude (PSA) of the suspension 8 and a second part of the continuous cycle adjusts a roll static attitude (RSA) of the suspension 8.

Figure 2:
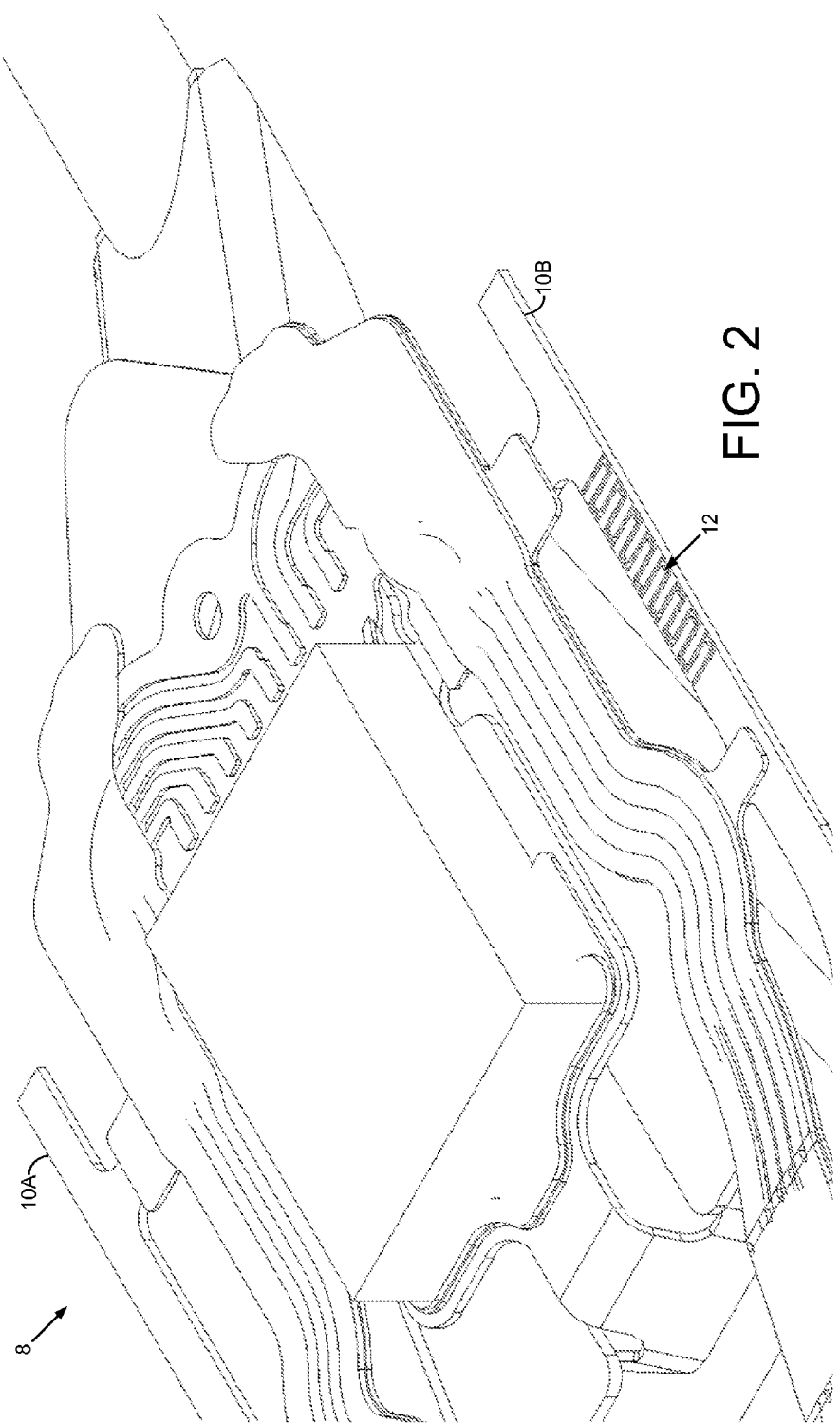
FIG. 2 shows an embodiment wherein the suspension comprises at least one continuous cycle of a periodic pattern (a square wave in this embodiment) etched on the suspension, wherein a first part of the continuous cycle adjusts a pitch static attitude (PSA) of the suspension and a second part of the continuous cycle adjusts a roll static attitude (RSA) of the suspension.

FIG. 2 shows an example embodiment wherein the suspension 8 comprises a first outer arm 10A and a second outer arm 10B, and the periodic pattern comprises a square wave 12 etched along only the second outer arm 10B. In one embodiment, the vertical side segments of the square wave 12 provide PSA adjustment and the horizontal top and bottom segments of the square wave 12 provide RSA adjustment.

The periodic pattern such as the square wave 12 shown in FIG. 2 may be etched on the suspension 8 using any suitable technique, wherein in one embodiment the etching is implemented using a suitable laser. In one embodiment, a continuous power is applied to the laser to etch at least one cycle of a periodic pattern on the suspension 8 which in one embodiment improves the accuracy and/or range of the PSA/RSA adjustment as compared to a prior art technique that may use a laser to etch discrete horizontal and vertical lines on the suspension. For example, cycling the laser on/off/on as each discrete vertical line is etched may result in inconsistencies of the resulting pattern, which in turn may reduce the effective PSA/RSA adjustment accuracy and/or range. This inconstancy in the prior art patterns is overcome, in one embodiment, by continuously etching the pattern so as to form at least one cycle of a periodic pattern, such as one cycle of a square wave as shown in FIG. 2. That is, in one embodiment the laser is continuously powered while etching at least one cycle of the periodic pattern, thereby avoiding the inconsistencies that may be caused by cycling the laser power when etching discrete lines as in the prior art.

Figure 3:
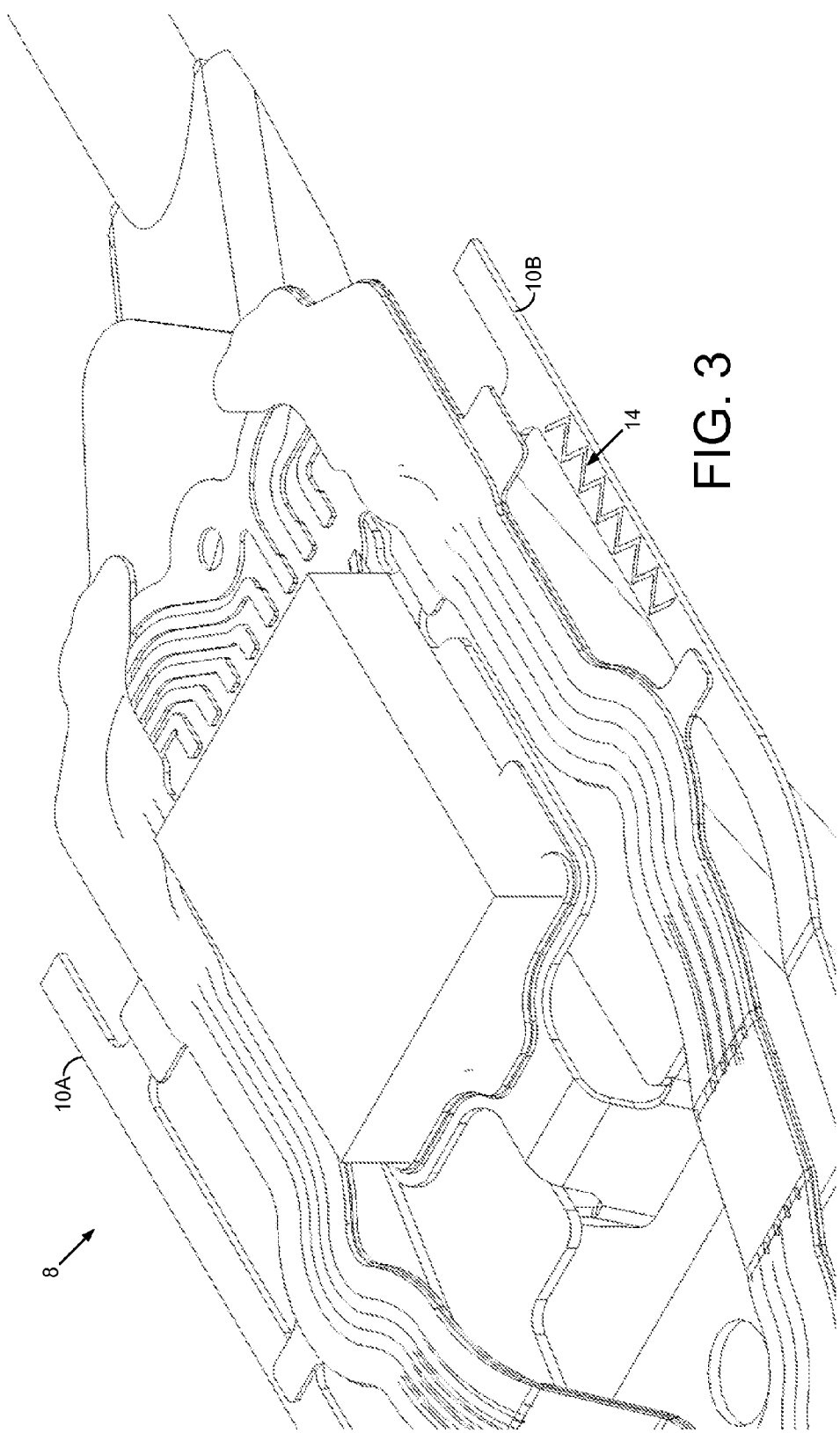
FIG. 3 shows an embodiment wherein the periodic pattern etched on the suspension comprises a triangle wave.
Figure 4:
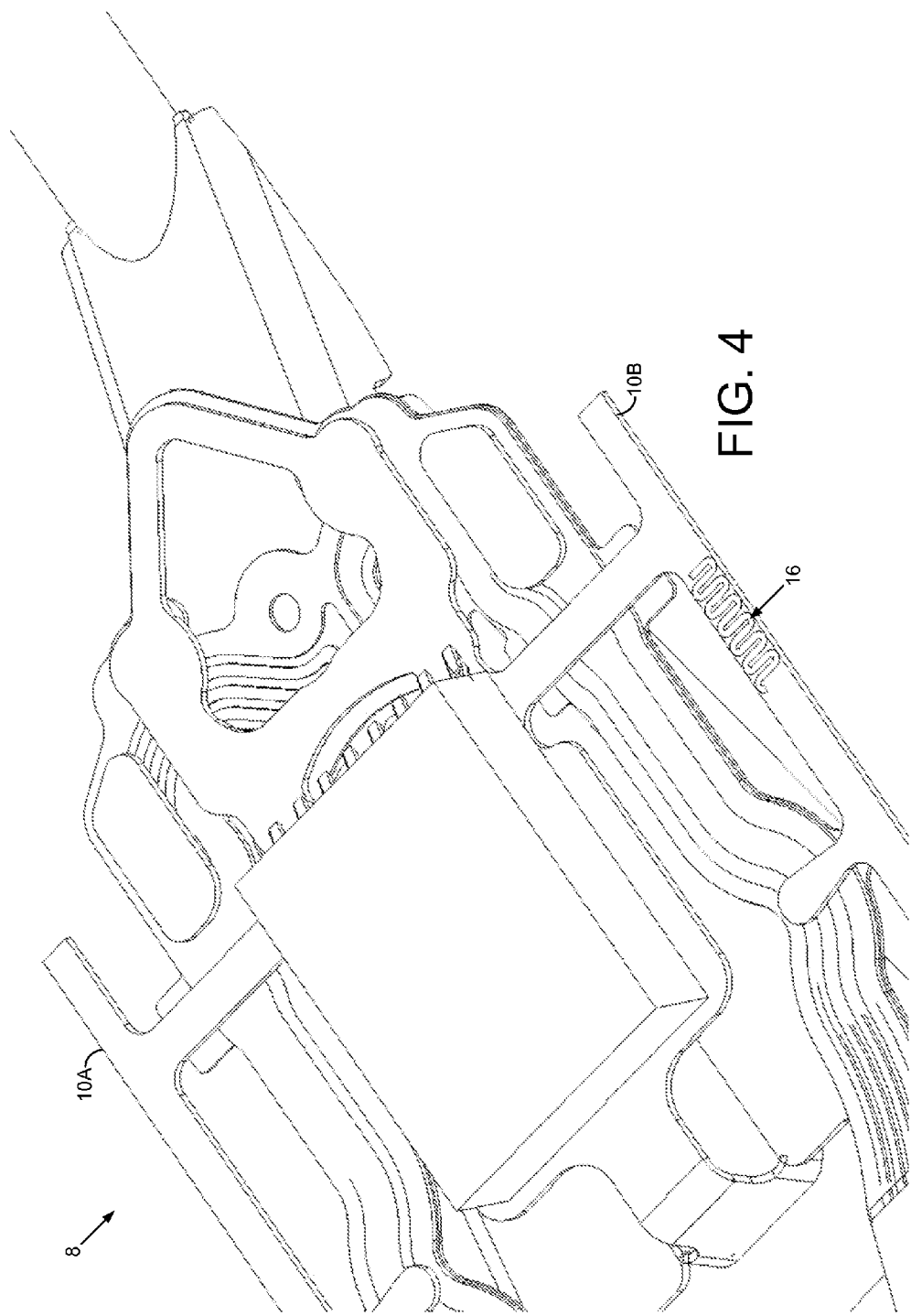
FIG. 4 shows an embodiment wherein the periodic pattern etched on the suspension comprises a sinusoidal wave.

Any suitable pattern may be etched on the suspension 8, wherein FIG. 3 shows an embodiment where the periodic pattern may comprise a triangle wave 14, and FIG. 4 shows an embodiment wherein the periodic pattern may comprise a sinusoidal wave 16. In addition, in one embodiment, multiple of the periodic patterns may be etched onto the suspension 8. For example, in the embodiment shown in FIG. 2, multiple square wave patterns 12 may be etched onto the suspension 8, such as by etching a square wave pattern 12 on each of the outer arms 10A and 10B. In another embodiment, multiple of the periodic patterns may be etched onto a single one of the outer arms 10A or 10B, wherein each pattern may be spaced apart by any suitable distance. In yet another embodiment, multiple different types of periodic patterns may be etched onto the suspension 8, such as by etching a square wave pattern and a triangle pattern or any other suitable combination of patterns.

In one embodiment, one or more signal characteristics of the periodic pattern may affect the PSA or RSA of the suspension. For example, in one embodiment a cycle of the periodic pattern may be etched on the suspension 8 with a preconfigured period, duty cycle, and/or amplitude in order to adjust at least one of the PSA and RSA of the suspension. In one embodiment, the signal characteristics of the periodic pattern may remain constant over all cycles, and in another embodiment the signal characteristics may be varied over the cycles while etching the periodic pattern. Any suitable technique may be employed to determine the desired periodic pattern and signal characteristics of the periodic pattern, such as by etching different types of periodic patterns with different signal characteristics on different test suspensions 8 and evaluating the resulting PSA and RSA performance. After the desired periodic pattern and signal characteristics are determined for a particular suspension design, the periodic pattern may be etched on the production suspensions employed in the production data storage devices.

What is claimed is:

1. A method of manufacturing a suspension for a head of a data storage device, the method comprising etching at least one continuous cycle of a periodic pattern on the suspension, wherein a first part of the continuous cycle adjusts a pitch static attitude (PSA) of the suspension and a second part of the continuous cycle adjusts a roll static attitude (RSA) of the suspension.

2. The method as recited in claim 1, wherein etching the at least one continuous cycle comprises continuously etching with a laser.

3. The method as recited in claim 1, wherein the suspension comprises a first and a second outer arm, and the method further comprises etching the at least one continuous cycle of the periodic pattern along only one of the arms.

4. The method as recited in claim 1, wherein the periodic pattern comprises a square wave.

5. The method as recited in claim 1, wherein the periodic pattern comprises a triangle wave.

6. The method as recited in claim 1, wherein the periodic pattern comprises a sinusoidal wave.

7. The method as recited in claim 1, further comprising etching at least two continuous cycles of the periodic pattern on the suspension.

8. The method as recited in claim 7, further comprising configuring at least one of a period, duty cycle, and amplitude of at least one of the continuous cycles in order to adjust at least one of the PSA and RSA of the suspension.

9. A suspension for a head of a data storage device, the suspension comprising at least one continuous cycle of a periodic pattern etched on the suspension, wherein a first part of the continuous cycle adjusts a pitch static attitude (PSA) of the suspension and a second part of the continuous cycle adjusts a roll static attitude (RSA) of the suspension.

10. The suspension as recited in claim 9, wherein the at least one continuous cycle of the periodic pattern is etched continuously with a laser.

11. The suspension as recited in claim 9, wherein the suspension comprises a first and a second outer arm, and the at least one continuous cycle of the periodic pattern is etched along only one of the arms.

12. The suspension as recited in claim 9, wherein the periodic pattern comprises a square wave.

13. The suspension as recited in claim 9, wherein the periodic pattern comprises a triangle wave.

14. The suspension as recited in claim 9, wherein the periodic pattern comprises a sinusoidal wave.

15. The suspension as recited in claim 9, comprising at least two continuous cycles of the periodic pattern etched on the suspension.

16. A data storage device comprising a head actuated over a disk, wherein:
   the head is coupled to a distal end of an actuator arm through a suspension; and
   the suspension comprises at least one continuous cycle of a periodic pattern etched on the suspension, wherein a first part of the continuous cycle adjusts a pitch static attitude (PSA) of the suspension and a second part of the continuous cycle adjusts a roll static attitude (RSA) of the suspension.

17. The data storage device as recited in claim 16, wherein the suspension comprises a first and a second outer arm, and the at least one continuous cycle of the periodic pattern is etched along only one of the arms.

18. The data storage device as recited in claim 16, wherein the periodic pattern comprises a square wave.

19. The data storage device as recited in claim 16, wherein the periodic pattern comprises a triangle wave.

20. The data storage device as recited in claim 16, wherein the periodic pattern comprises a sinusoidal wave.

* * * * *